(12) United States Patent
Ozdemir et al.

(10) Patent No.: US 8,040,626 B2
(45) Date of Patent: Oct. 18, 2011

(54) HIGH-RATE TRANSITION CONTROL CODE FOR MAGNETIC RECORDING CHANNELS

(75) Inventors: Hakan C. Ozdemir, Los Gatos, CA (US); Razmik Karabed, San Jose, CA (US); Richard Barndt, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 56 days.

(21) Appl. No.: 12/610,036

(22) Filed: Oct. 30, 2009

(65) Prior Publication Data
US 2011/0075289 A1 Mar. 31, 2011

Related U.S. Application Data

(60) Provisional application No. 61/245,975, filed on Sep. 25, 2009.

(51) Int. Cl.
*G11B 20/14* (2006.01)
(52) U.S. Cl. ........................................................ 360/40
(58) Field of Classification Search .................. 360/40, 360/39, 44, 61, 67; 714/701, 709, 811; 713/189
See application file for complete search history.

(56) References Cited

U.S. PATENT DOCUMENTS

| | | | | |
|---|---|---|---|---|
| 3,056,110 A * | 9/1962 | Cypser et al. | ................. | 714/701 |
| 3,449,716 A * | 6/1969 | Cuddeback et al. | .......... | 714/709 |
| 4,271,522 A * | 6/1981 | Droux et al. | .................. | 714/811 |
| 4,298,898 A * | 11/1981 | Cardot | ............................ | 360/67 |
| 7,577,850 B2 * | 8/2009 | Barr | .............................. | 713/189 |

\* cited by examiner

*Primary Examiner* — Fred Tzeng
(74) *Attorney, Agent, or Firm* — Lisa K. Jorgenson; William A. Munck

(57) ABSTRACT

A method and apparatus for reducing noise in a communication signal is provided. The method includes converting raw channel data from the communication signal to a sequence of transition code symbols, each symbol having a plurality of bits, each bit having a position within the symbol. The method also includes sending the bits of each symbol to a plurality of bins, each bin corresponding to the position of each bit within the symbol. For each bin having a number of transitions greater than a number of non-transitions, the method also includes flipping every bit in the bin and setting a corresponding bit in a flip control word to a first value. The method still further includes binary adding the flip control word to each transition code symbol.

20 Claims, 3 Drawing Sheets

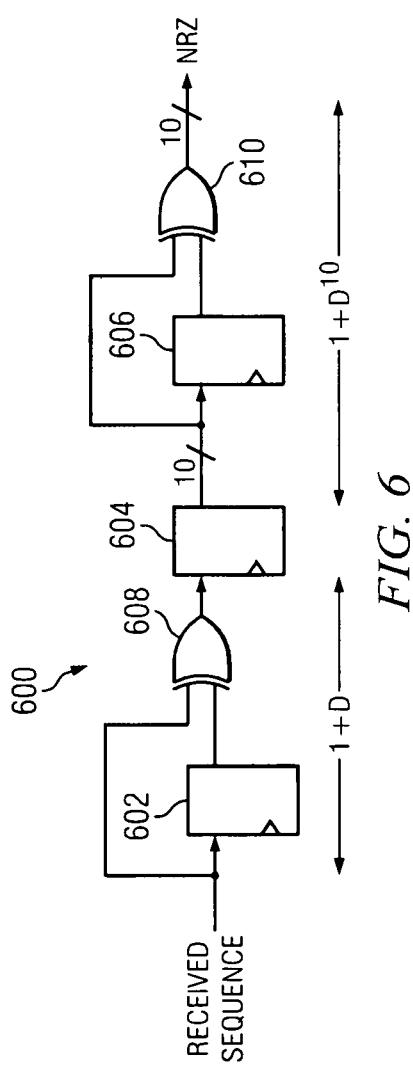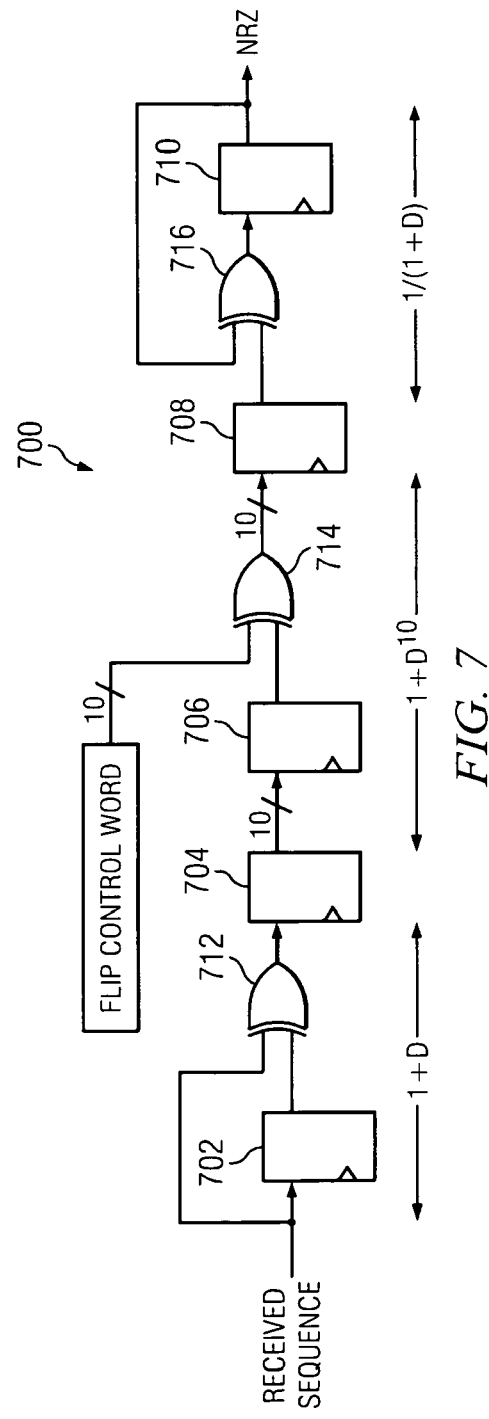

us 8,040,626 B2

HIGH-RATE TRANSITION CONTROL CODE FOR MAGNETIC RECORDING CHANNELS

CROSS-REFERENCE TO RELATED APPLICATION(S) AND CLAIM OF PRIORITY

The present application is related to U.S. Provisional Patent Application No. 61/245,975, filed Sep. 25, 2009, entitled "HIGH-RATE TRANSITION CONTROL CODE FOR MAGNETIC RECORDING CHANNELS". Provisional Patent Application No. 61/245,975 is assigned to the assignee of the present application and is hereby incorporated by reference into the present application as if fully set forth herein. The present application hereby claims priority under 35 U.S.C. §119(e) to U.S. Provisional Patent Application No. 61/245,975.

TECHNICAL FIELD OF THE INVENTION

The present disclosure is directed, in general, to magnetic recording channels, and more specifically, to high-rate transition control code for reducing jitter noise in magnetic recording channels.

BACKGROUND OF THE INVENTION

Jitter is the time variation of a periodic signal in electronics and telecommunications, often in relation to a reference clock source. Jitter may be observed in characteristics such as the frequency of successive pulses, the signal amplitude, or phase of periodic signals. Jitter is a significant, and usually undesired, factor in the design of almost all communications links. Jitter in magnetic media often constitutes the dominant source of signal noise. On average, jitter contributes eighty percent (80%) of signal noise, versus twenty percent (20%) of AWG (additive white Gaussian) noise, in modern perpendicular recording media.

Data transitions can contribute to the presence of jitter in a communication signal. In a sequence of data bits, a change from a one to a zero, or from a zero to one, represents a transition. As data transitions increase in a communication signal, a corresponding increase in jitter can be seen. As a result, as transition density in a communication channel increases, the signal-to-noise ratio (SNR) of the signal decreases.

There is, therefore, a need in the art for improved high-rate transition control code for reducing jitter noise in magnetic recording channels.

SUMMARY OF THE INVENTION

A method for reducing noise in a communication signal is provided. The method includes converting raw channel data from the communication signal to a sequence of transition code symbols, each symbol having a plurality of bits, each bit having a position within the symbol. The method also includes sending the bits of each symbol to a plurality of bins, each bin corresponding to the position of each bit within the symbol. For each bin having a number of transitions greater than a number of non-transitions, the method also includes flipping every bit in the bin and setting a corresponding bit in a flip control word to a first value. The method still further includes binary adding the flip control word to each transition code symbol.

An apparatus for reducing noise in a communication signal is provided. The apparatus includes a data converter circuit configured to convert raw channel data from a communication signal to a sequence of transition code symbols, each symbol having a plurality of bits, each bit having a position within the symbol. The apparatus also includes a histogram block comprising a plurality of bins, the histogram block configured to receive the bits of each symbol and place the bits of each symbol into the plurality of bins, each bin corresponding to the position of each bit within the symbol. The apparatus also includes a flip control block that, for each bin in the histogram block having a number of transitions greater than a number of non-transitions, is configured to flip every bit in the bin, and set a corresponding bit in a flip control word to a first value. The apparatus further includes an XOR logic block used to binary add the flip control word to each transition code symbol.

A magnetic recording system having a magnetic medium configured to store a communication signal and a transition control encoder is provided. The transition control encoder includes a data converter circuit configured to convert raw channel data from the communication signal to a sequence of transition code symbols, each symbol having a plurality of bits, each bit having a position within the symbol. The transition control encoder also includes a histogram block comprising a plurality of bins, the histogram block configured to receive the bits of each symbol and place the bits of each symbol into the plurality of bins, each bin corresponding to the position of each bit within the symbol. The transition control encoder also includes a flip control block that, for each bin in the histogram block having a number of transitions greater than a number of non-transitions, is configured to flip every bit in the bin, and set a corresponding bit in a flip control word to a first value. The transition control encoder further includes an XOR logic block used to binary add the flip control word to each transition code symbol.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6 and 7 depict block diagrams showing two examples of a decoder of the TRC, according to embodiments of the present disclosure.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged data encoder.

The transition control code according to the present disclosure solves many of the problems found in conventional magnetic recording systems. The transition control code disclosed herein reduces jitter noise in magnetic recording channels by reducing the average number of magnetic transitions. This is achieved by analyzing the channel data and flipping transitions into non-transitions at certain locations that have an excess amount of transitions. This reduces jitter noise and increases effective signal to noise ratio. The performance gain can be used either for power savings in the channel system-on-a-chips (SoCs), or to increase the data written to the disk. The existence of this code can easily be detected by counting the number of transitions at the input and output of the channel.

The transition control code described in this disclosure reduces the average number of transitions in a sector. The encoder analyzes the raw channel data, and then flips some transitions so that the total number of transitions in the encoded output does not exceed fifty percent (50%). The overhead of the code is an additional ten (10) bits for each approximately 512 byte sector (or block).

A second embodiment of the transition control code allows control of long run lengths of "0"s and "1"s, as well as Nyquist patterns, without affecting the code rate. Simulations using a model of an LDPC read channel with the transition control code according to the present disclosure showed an average SNR improvement of about 0.15 dB, mainly due to the reduction of jitter noise.

Encoder

Figure 1:
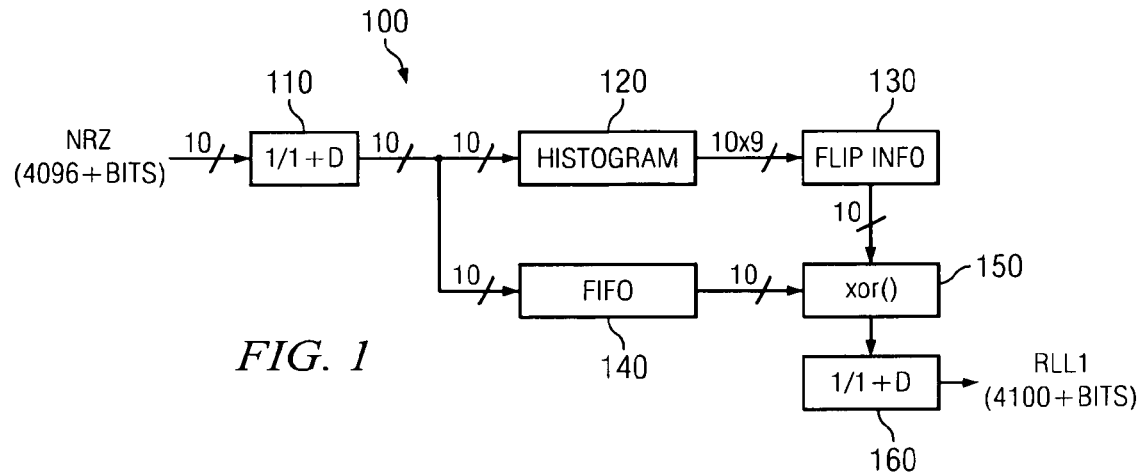
FIG. 1 depicts a block diagram of an encoder that uses the high-rate transition control code (TRC) code, according to one embodiment of the present disclosure.

FIG. 1 depicts a block diagram of an encoder 100 that uses the high-rate TRC code, according to one embodiment of the present disclosure. The encoder 100 includes a histogram block 120 and a Flip Control block 130. In one embodiment of the TRC code, the encoder 100 also includes a $1/(1+D^{10})$ precoder circuit 110. The precoder 110 is initialized with ten (10) bits of a raw non-return-to-zero (NRZ) signal and converts the signal to transition code. In the transition code at the output of the precoder 110, logic "1"s are considered transitions. Logic "0"s represent no transition. In the histogram block 120, the bits of the transition code are placed sequentially into ten (10) bins. The Flip Control block 130 performs a statistical analysis of the average transition information in each bin and creates a 10-bit control word, where each bit of the control word is associated with one of the ten bins. At an XOR logic block 150, the 10-bit control word is added to each 10-bit symbol received from a precoder first-in, first-out (FIFO) buffer 140. After this, the output is converted back to a NRZ signal by a $1/(1+D)$ circuit 160.

Although the encoder in the exemplary embodiment shown in FIG. 1 includes a precoder, another embodiment of the encoder allows the precoder 110 to be bypassed. In this embodiment, the user bits are converted to transitions (with a 1+D circuit) before the statistical analysis is performed at the Flip Control block 130. This way, precoding will not increase the number of transitions in a block with an already small number of transitions.

Figure 2:
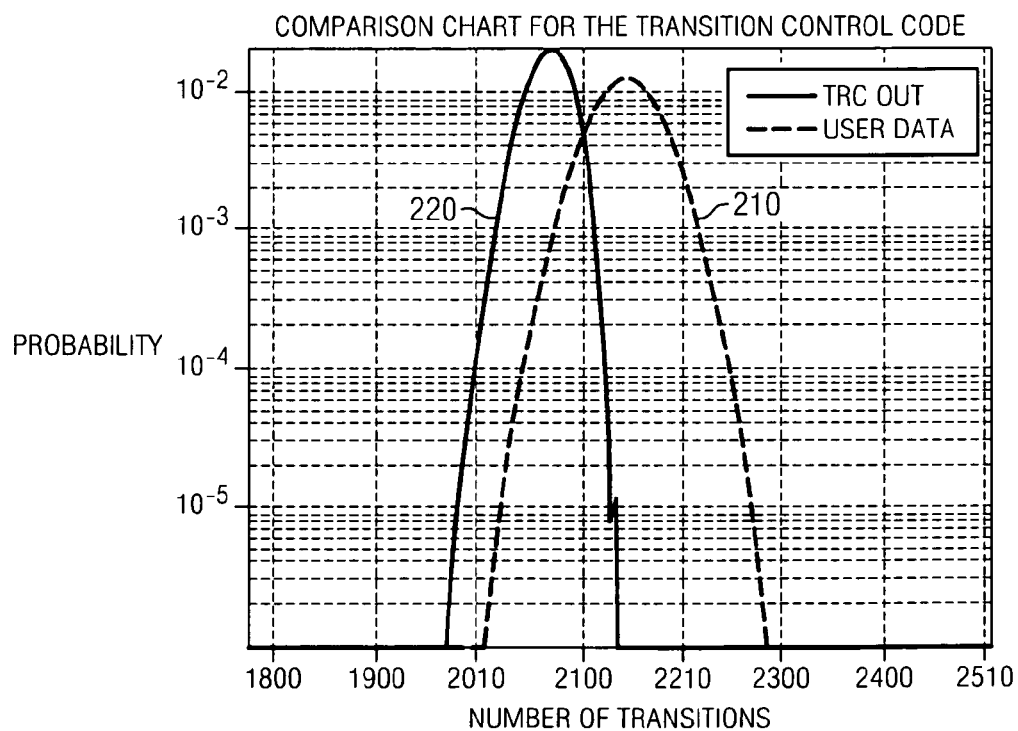
FIG. 2 depicts a graph showing the probability of a number of transitions in a magnetic recording channel in simulation tests before and after using the TRC code, according to one embodiment of the present disclosure.

FIG. 2 depicts a graph showing the probability of a number of transitions in a magnetic recording channel in simulation tests before and after using the TRC code, according to one embodiment of the present disclosure. Data curve 210 shows the probability of a number of transitions in the channel before the TRC code. Data curve 220 shows the probability of a number of transitions in the channel after the TRC code.

In each test, each channel includes approximately 4,300 data bits. The number of transitions in each channel is calculated, and the result is plotted as a probability point on the graph. Over a large number of tests, data curves 210 and 220 are developed. Data curve 210 illustrates that, in a given test before using the TRC code, the most likely number of transitions in a channel is approximately 2,150 transitions, which corresponds to approximately fifty percent (50%) of the data bits in the channel. Data curve 220 illustrates that, after using the TRC code on the channel data, the most likely number of transitions in a channel is 2,080 transitions. It is also evident from the right side of data curve 220 that the probability of having more than 2,150 transitions in a channel after application of the TRC code is essentially zero. This result is due to the fact that the TRC code flips the transitions in a block of the channel when the when the block has more than fifty percent (50%) transitions, as explained in greater detail below. This overall improvement in the number of transitions is a result of the use of the TRC code.

Precoder

Figure 3:
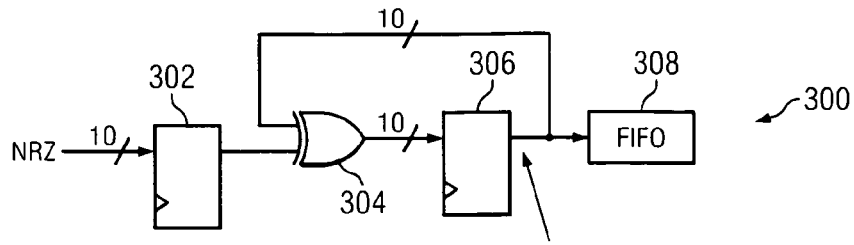
FIG. 3 depicts a block diagram of a precoder, according to one embodiment of the present disclosure.

FIG. 3 depicts a block diagram of a precoder 300, according to one embodiment of the present disclosure. In certain embodiments, the precoder 300 may be used as the precoder 110 shown in FIG. 1. Similar to a high rate run-length limited (HR-RLL) encoder, the precoder 300 is a simple $1/(1+D^{10})$ circuit. The precoder 300 includes latches (or flip-flops) 302 and 306, a XOR logic gate 304 and a FIFO buffer 308. In certain embodiments, the FIFO buffer 308 may be used as the FIFO buffer 140 shown in FIG. 1.

In an exemplary embodiment, the precoder 300 has the following inputs:

DATA 10 bits user data

CLK Master Clock for the TRC encoder

RESET_B Master Reset for TRC encoder

In an exemplary embodiment, the precoder 110 has the following output:

ENC_OUT 10 bits transition data output to the histogram block

The precoder 300 is reset to ten (10) zero bits (e.g., "0000000000"). Feeding the precoder FIFO starts with this reset value.

In certain embodiments, the precoder 300 can optionally be bypassed with a 1+D circuit that converts the user data into transitions. Accordingly, precoding will not increase the number of transitions in a block that already has a low transition density.

Histogram

Figure 4:
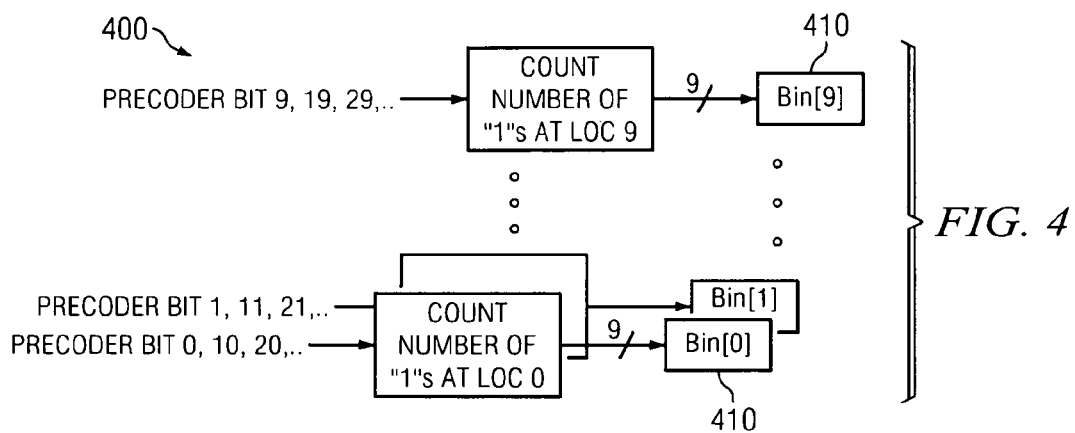
FIG. 4 depicts a block diagram of a histogram block, according to one embodiment of the present disclosure.

FIG. 4 depicts a block diagram of a histogram block 400, according to one embodiment of the present disclosure. In certain embodiments, the histogram block 400 may be used as the histogram block 120 shown in FIG. 1. The histogram block 400 includes ten (10) bins 410, which are labeled Bin(0) through Bin(9). The histogram block 400 receives transition data representing transitions of a communication channel signal in order to determine the number of transitions in each channel block.

To determine the number of transitions, the histogram block 400 receives transition data from the precoder 200 in 10-bit symbols. Each bit of the 10-bit symbol is placed in a different bin, where the bin number corresponds to the bit placement in the 10-bit symbol. For example, bit 0 of the 10-bit symbol is placed in Bin(0), bit 1 is placed in Bin(1), etc. As each 10-bit symbol of the channel block is received at the histogram block 400, the bits are placed into the corresponding bins until the entire channel block has been received. Thus, Bin(0) contains precoder bits 0, 10, 20, etc. Likewise, Bin(9) contains precoder bits 9, 19, 29, etc. This data will be used by the Flip Control block 130 to generate a 10-bit control word for determining which bin(s) contain transitions that are to be flipped.

Figure 5:
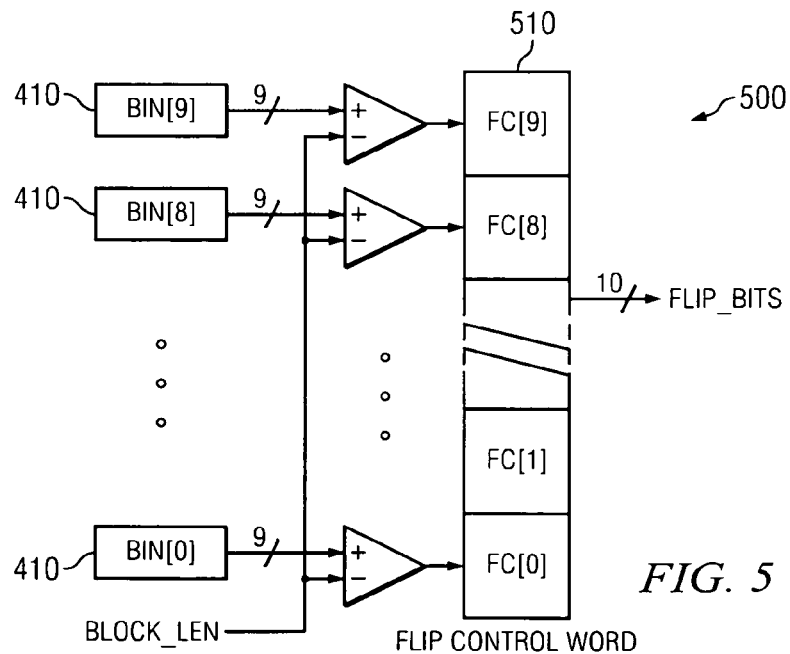
FIG. 5 depicts a block diagram of a Flip Control block, according to one embodiment of the present disclosure.

In an exemplary embodiment, the histogram block 400 has the following inputs:
PRECODER_OUT 10-bit symbols output from the Precoder or from the 1+D circuit
CLK Master Clock for the TRC encoder
RESET_B Master Reset for TRC encoder In an exemplary embodiment, the histogram block 400 has the following output:
HIST_OUT 10 bins×9-bit bus that are output to Flip Control block Flip Control FIG. 5 depicts a block diagram of a Flip Control block 500, according to one embodiment of the present disclosure. In certain embodiments, the Flip Control block 500 may be used as the Flip Control block 130 shown in FIG. 1. The Flip Control block 500 counts the number of transitions and non-transitions in each of the bins 410 (i.e., Bin(0) through Bin(9)). As described above, a "1" bit in any of the bins 410 represents a corresponding transition in the channel signal. Likewise, a "0" bit in any of the bins 410 represents a non-transition. The Flip Control block 500 counts the number of "1" bits and "0" bits in each of the bins 410.

If the number of "1" bits exceeds the number of "0" bits in any bin 410, then that bin 410 has more than fifty percent transitions. In the case of a bin 410 having more than fifty percent transitions, each bit in that bin 410 is flipped (i.e., every "0" bit becomes a "1" bit, and every "1" bit becomes a "0" bit). Once that bin 410 has been flipped, it will contain more "0" bits than "1" bit, thus having less than fifty percent transitions.

The Flip Control block 500 produces a 10-bit flip control word 510. Each bit in the flip control word 510 corresponds to one of the bins 410. The flip control word 510 is initially set to ten (10) zero bits (e.g., "0000000000"). If the bits in a bin 410 are flipped, then the corresponding bit in the flip control word 510 is set to "1". For example, if the bits in Bin(3) are flipped, then the third bit of the flip control word 510 is set to "1". Thus, the flip control word 510 serves to indicate which of the bins 410 have been flipped due to having greater than fifty percent transitions.

In an exemplary embodiment, the Flip Control block 500 has the following inputs:
BIN_0, BIN_1, . . . , BIN_9, 10×9-bit bus from the Histogram block
CLK Master Clock for the TRC encoder
RESET_B Master Reset for TRC encoder In an exemplary embodiment, the Flip Control block 500 has the following output:
FLIP_CONTROL 10-bit flip control word Addition and Conversion After the flip control word 510 is created, the XOR logic block 150 receives each 10-bit symbol from the precoder FIFO buffer 140 and binary adds the 10-bit flip control word 510 to the 10-bit symbol as shown in FIG. 1. Thus, the XOR logic block inverts some of the transitions based on the flip control word 510.

The final step in encoding is converting the transitions back into a NRZ signal by the 1/(1+D) circuit 160.

TRC Decoder

FIGS. 6 and 7 depict block diagrams showing two examples of a decoder of the TRC according to embodiments of the present disclosure. Decoders 600 and 700 convert the TRC coded data back to raw, unencoded channel data. Both decoders 600 and 700 consist of a 1+D circuit followed by a $1+D^{10}$ circuit. Decoder 700 additionally includes a 1/(1+D) circuit. Decoder 600 includes latches (or flip-flops) 602-606 and XOR logic gates 608 and 610. Decoder 700 includes latches 702-710 and XOR logic gates 712-716.

In certain embodiments, the first step of decoding the TRC code is converting the channel NRZ signal to transitions using a 1+D circuit.

The second step depends on whether or not precoding is used at the encoder 200. According to one embodiment, if precoding is used, decoding is completed using the decoder 600 as seen in FIG. 6. The decoder 600 uses a $1+D^{10}$ operation, since in this case "1"s at precoder output are regarded as transitions.

According to another embodiment, if no precoding is used in encoding, decoding is completed using the decoder 700 as seen in FIG. 7. In the decoder 700, the first 10 bits after the 1+D conversion of the received sequence (i.e., the flip control word 510) are binary added to each consequently received 10-bit symbol. The resulting stream may then be converted to NRZ by a final 1/(1+D) circuit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for reducing noise in a communication signal:
converting raw channel data from the communication signal to a sequence of transition code symbols, each symbol having a plurality of bits, each bit having a position within the symbol;
sending the bits of each symbol to a plurality of bins, each bin corresponding to the position of each bit within the symbol; and
for each bin having a number of transitions greater than a number of non-transitions, flipping every bit corresponding to the bin by:
setting a corresponding bit in a flip control word to a first value, and
binary adding the flip control word to each transition code symbol.

2. The method of claim 1, further comprising converting the transition code symbols back to the raw channel data.

3. The method of claim 1, wherein the plurality of bins comprises N bins and the flip control word comprises N bits.

4. The method of claim 1, wherein the raw channel data is converted to the sequence of transition code symbols using a 1+D circuit.

5. The method of claim 3, wherein the raw channel data is converted to the sequence of transition code symbols using a $1/(1+D^N)$ circuit.

6. The method of claim 5, wherein N equals 10.

7. The method of claim 1, wherein the communication signal is a non-return-to-zero (NRZ) signal.

8. The method of claim 1, further comprising counting the number of transitions and the number of non-transitions in each bin.

9. The method of claim 1, wherein the flip control word is binary added to each transition code symbol using an XOR logic gate.

10. An apparatus comprising:
a data converter circuit configured to convert raw channel data from a communication signal to a sequence of transition code symbols, each symbol having a plurality of bits, each bit having a position within the symbol;
a histogram block comprising a plurality of bins, the histogram block configured to receive the bits of each symbol and place the bits of each symbol into the plurality of bins, each bin corresponding to the position of each bit within the symbol; and
a flip control block configured, for each bin in the histogram block having a number of transitions greater than a number of non-transitions, to flip every bit corresponding to the bin by:
setting a corresponding bit in a flip control word to a first value, and
using an XOR logic block configured to binary add the flip control word to each transition code symbol.

11. The apparatus of claim 10, further comprising a decoder configured to convert the transition code symbols back to the raw channel data.

12. The apparatus of claim 10, wherein the plurality of bins comprises N bins and the flip control word comprises N bits.

13. The apparatus of claim 10, wherein the data converter circuit comprises a 1+D circuit.

14. The apparatus of claim 12, wherein the data converter circuit comprises a $1/(1+D^N)$ circuit.

15. The apparatus of claim 10, wherein the flip control block is further configured to count the number of transitions and the number of non-transitions in each bin.

16. A magnetic recording system comprising:
a magnetic medium configured to store a communication signal; and
a transition control encoder comprising:
a data converter circuit configured to convert raw channel data from the communication signal to a sequence of transition code symbols, each symbol having a plurality of bits, each bit having a position within the symbol;
a histogram block comprising a plurality of bins, the histogram block configured to receive the bits of each symbol and place the bits of each symbol into the plurality of bins, each bin corresponding to the position of each bit within the symbol;
a flip control block configured, for each bin in the histogram block having a number of transitions greater than a number of non-transitions, to flip every bit corresponding to the bin by:
setting a corresponding bit in a flip control word to a first value, and
using an XOR logic block configured to binary add the flip control word to each transition code symbol.

17. The magnetic recording system of claim 16, the transition control encoder further comprising a decoder configured to convert the transition code symbols back to the raw channel data.

18. The magnetic recording system of claim 16, wherein the plurality of bins comprises N bins and the flip control word comprises N bits.

19. The magnetic recording system of claim 16, wherein the data converter circuit comprises a 1+D circuit.

20. The magnetic recording system of claim 18, wherein the data converter circuit comprises a $1/(1+D^N)$ circuit.

* * * * *